Feb. 24, 1942.  H. O. ROOSENSTEIN  2,274,346
FREQUENCY SELECTIVE TRANSMISSION LINE
Filed Dec. 31, 1938
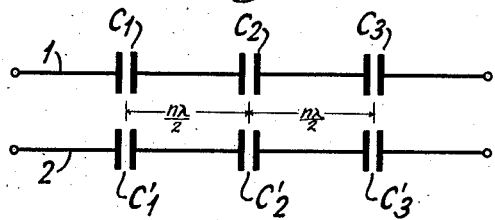
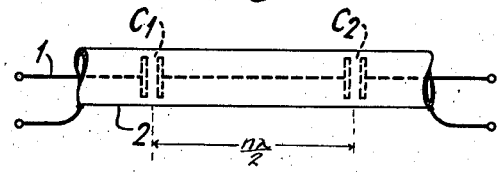
INVENTOR.
HANS OTTO ROOSENSTEIN
BY
ATTORNEY.

UNITED STATES PATENT OFFICE 2,274,346

FREQUENCY SELECTIVE TRANSMISSION LINE

Hans Otto Roosenstein, Berlin-Tempelhof, Germany, assignor to Telefunken Gesellschaft für Drahtlose Telegraphie m. b. H., Berlin, Germany, a corporation of Germany Application December 31, 1938, Serial No. 248,804
In Germany January 27, 1938

4 Claims. (Cl. 178—44)

The invention is concerned with a two-wire line for ultra short waves which insures a band-pass filter effect by virtue of its special resonance properties. In order to raise the selectivity of a tuned two-wire line, it is known in the art to bridge the double-wire line at the nodal points of the standing waves arising upon it. It has also been suggested in the earlier art not to place such bridging means exactly in the nodal points of a wave corresponding to a mean frequency, with a view to insuring a band-pass filter effect, but rather at unlike distances somewhat laterally thereof to thus result in a sort of arrangement comprising a seriation of dissimilarly tuned oscillation circuits, and that, as well known, results in a band-pass filter. The arrangement suggested, however, involves a number of drawbacks, and these are primarily due to the fact that in the bridging points extremely large currents are flowing, and, moreover, that in case of conductive bridging it is not possible to separate the two conductors for direct current.

Contradistinct to the prior art, the present invention is concerned with a double-wire line which is free from the said drawbacks and which is adapted to raise the selectivity as well as the broadening of the resonance curve. According to the invention, spaced roughly a half wavelength ($\lambda/2$) apart are connected series impedances whereby the line is divided into a plurality of circuits being connected with one another. The impedances which may be considered for the said purpose may be any desired series impedances at all, such as, for instance, capacities or tuned oscillation circuits. Because of the requisite loose coupling, the resistance of the same must, of course, be high. If there is only one wave that is to be transmitted, and if the spacing of the impedances is exactly equal to $\lambda/2$ or a multiple thereof, then the impedances will be located exactly in the anti-nodes or the loops of the line; and if the coupling is suitably chosen, that is to say, if the resistance values are chosen conveniently, there results an essential increase in selectivity. By choosing different values for the impedances, that is, by changing the coupling, it is then feasible to secure a band-pass filter action which corresponds to the well-known effect of two intercoupled oscillation circuits tuned to one and the same wave. The same band-pass filter action could also be obtained by making the spacing of the series impedances from one another different; in other words, by mounting the impedances not exactly in the potential loops or anti-nodes of the mean wave, or any other waves, of the band to be transmitted, but rather irregular distances away therefrom. In other words, by using different values for different condensers, we obtain differently tuned circuits; likewise, by means of unequal spacing between condensers, we obtain different values of inductance of the conductor between condensers and thus again obtain circuits tuned to different frequencies.

Figs. 1 and 2 show two exemplified embodiments of the invention.

Referring to Fig. 1, 1 and 2 are the two conductors of a tuned Lecher wire line. The oscillations to be transmitted are then fed to these conductors at one end, while the transmitted oscillations are put out at the opposite end thereof. Hence, this line could be conceived to be a quadripole or four-terminal network. Included in the line are the capacities $C_1$, $C_2$, $C_1'$, $C_2'$, etc., which represent the series impedances of the invention. These capacities could be combined with parallel-connected inductances to result in tuned circuits, with a view to raising their impedances.

If a coaxial line rather than a parallel wire line is used, it will be advantageous to include series impedances only in the inner conductor, as shown in Fig. 2, where $I$ is the inner conductor, 2 the envelope surrounding the inner conductor, $C_1$, $C_2$, the series impedances. As already pointed out, it is possible to secure band-pass filter action both by suitable choice of the impedance values as well as the distances between the various impedances. It is therefore advantageous to make the capacities $C_1$, $C_2$, etc. variable.

It will be noticed that the line does not comprise any cross arms which must be proportioned for large currents, as in the arrangements known and disclosed in the prior art. This does away with an appreciable source of losses, and this is an outstanding advantage of the invention.

The invention is not restricted to the exemplified embodiments here illustrated. In fact, it consists, broadly, in the fact that impedances are connected in series in a two-wire line at distances roughly one-half wavelength or a multiple of $\lambda/2$.

What is claimed is:

1. A selective coaxial line for the transmission of high frequency oscillations comprising an inner conductor having spaced condensers serially inserted therein, said condensers being arranged substantially at potential anti-nodal points along said conductor and having such values as to combine with the sections of inner conductor between them to form tuned circuits.

2. A line in accordance with claim 1, characterized in this that said condensers have different values whereby a band-pass characteristic is obtained.

3. A line in accordance with claim 1 for carrying a band of frequencies characterized in this that the spacing between condensers varies about the mean value of the spacing whereby a band pass characteristic is obtained.

4. A selective coaxial line for the transmission of high frequency oscillations comprising an inner conductor having spaced impedances serially inserted therein, said impedances being arranged substantially at potential anti-nodal points along said conductor and having such values as to combine with the sections of inner conductor between them to form tuned circuits and a continuous outer casing surrounding said inner conductor.

HANS OTTO ROOSENSTEIN.